Jan. 31, 1950   R. B. READE   2,495,766
BEACON SYSTEM
Filed Jan. 3, 1946   3 Sheets-Sheet 1
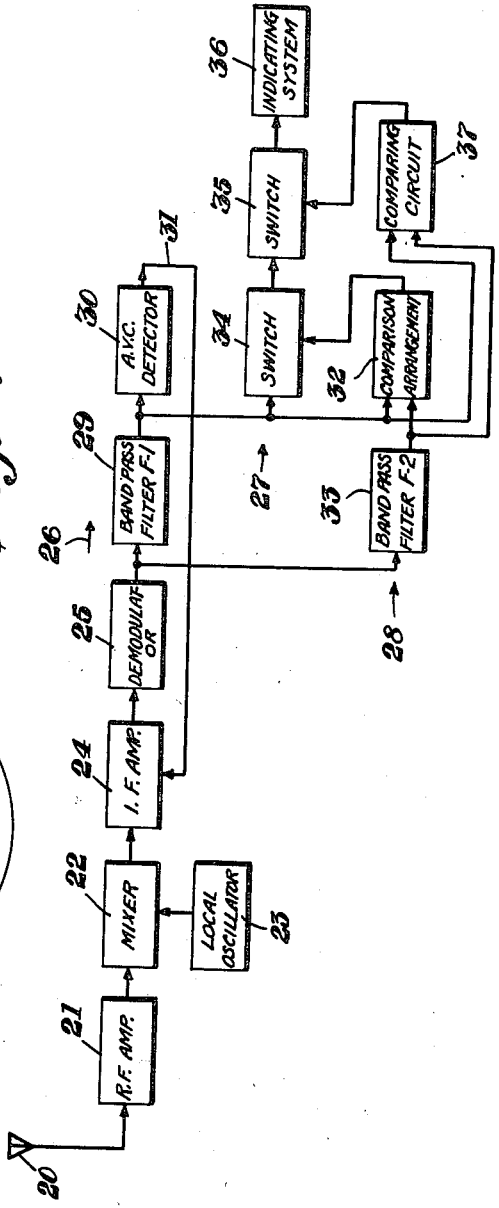
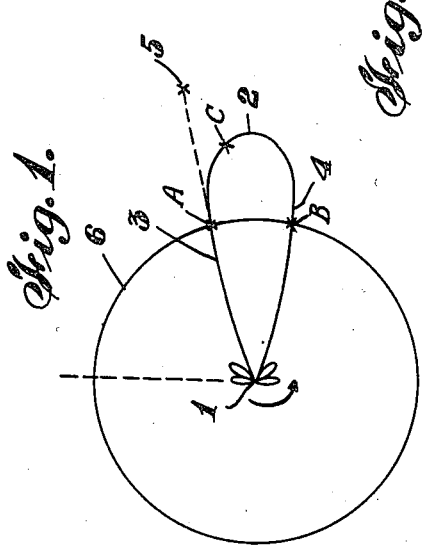
INVENTOR.
RALPH B. READE
BY
*R P Morris*
ATTORNEY Jan. 31, 1950    R. B. READE    2,495,766
BEACON SYSTEM
Filed Jan. 3, 1946    3 Sheets-Sheet 2

INVENTOR.
RALPH. B. READE
BY
R P Morris
ATTORNEY

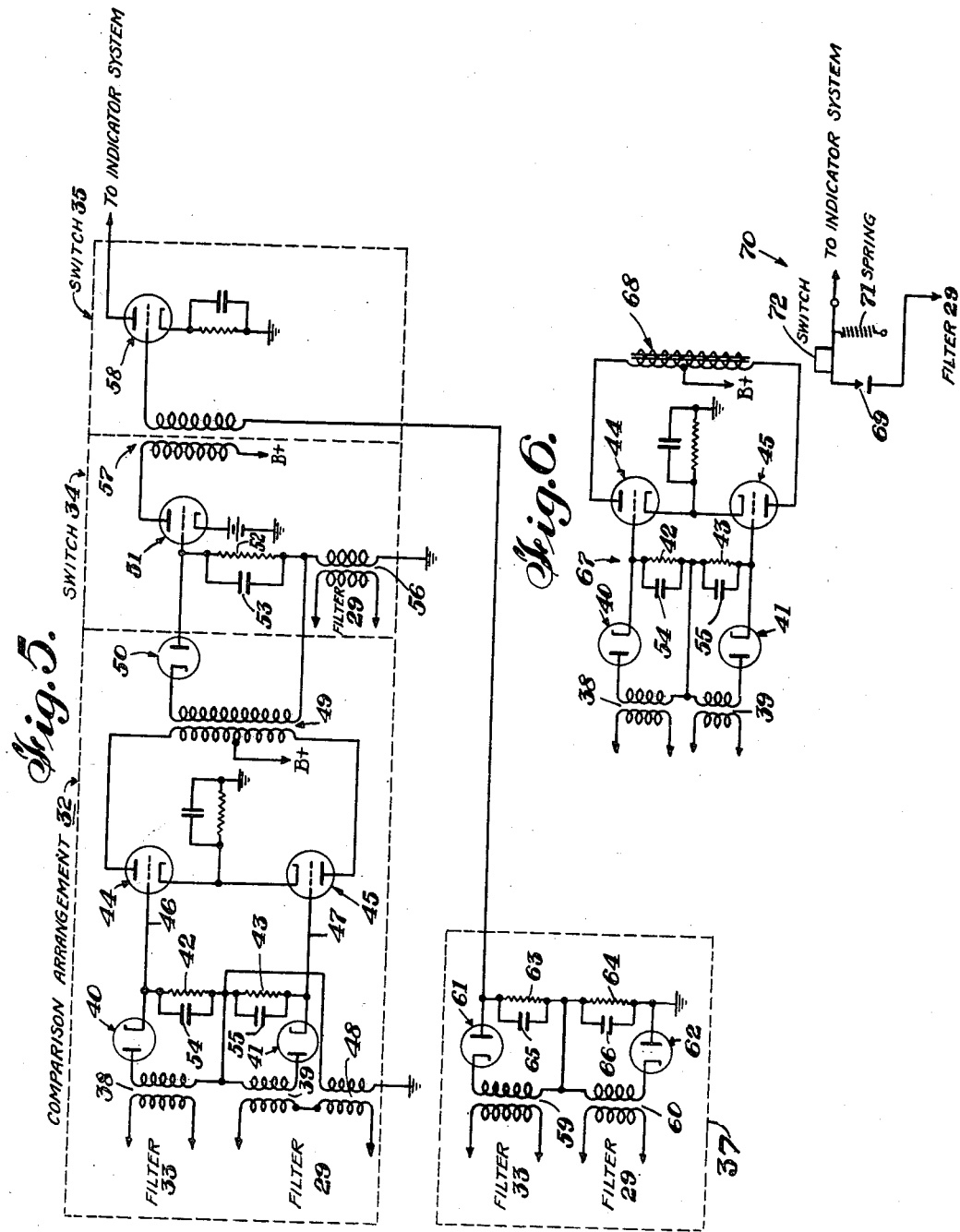

Patented Jan. 31, 1950

2,495,766

UNITED STATES PATENT OFFICE 2,495,766

BEACON SYSTEM

Ralph B. Reade, Larchmont, N. Y., assignor to Federal Telephone and Radio Corporation, New York, N. Y., a corporation of Delaware Application January 3, 1946, Serial No. 638,777

6 Claims. (Cl. 343—106)

This invention relates to beacon systems of the type in which an indication is produced in a receiving station (which may be in an aircraft, ship, vehicle, or other mobile unit) as to its instant direction from a beacon station.

In certain beacon systems of the general type to which this application relates, energy is transmitted in a directional beam which may, for example, have the field pattern of a major lobe. This lobe is continuously rotated through an azimuthal angle of 360° and as the lobe rotates, certain characteristics of the transmitted energy vary throughout the 360° so that there is a unique characteristic of the transmitted energy for every given azimuthal position of the lobe. The receiving station for such systems, which may be for example, a receiver mounted in an aircraft, receives energy from this beam as the beam sweeps by the craft and translates this energy, using the instantaneous characteristics of the beam as it passes over the craft to determine the direction of the craft from the beacon station.

Such directional beams have, however, a substantial width which may vary in specific instances from 20° to as much as 60°. Since the characteristics transmitted by the beacon usually indicate the azimuth of the center line of the beam, it becomes necessary to find this center line. Various systems for this purpose have been proposed but most of such systems produce an indication which is difficult to interpret, or have other defects.

An object of the present invention is the provision of an improved beacon system.

Another object of the present invention is the provision of an improved beacon system in which directional beam, in the form of a major lobe, rotated and the azimuth indicated by the signal transmitted from the beacon station is the azimuth of an edge of the rotating beam.

Another object is the provision of a beacon system of the type in which a directional beam with the field pattern of a major lobe is rotated and in which the leading edge of the rotating lobe used to indicate azimuth.

Other and further objects of the present invention will become apparent and the invention will be best understood from the following description of embodiments thereof, reference being had to the drawings, in which:

Fig. 1 is a diagram of a field pattern of the energy transmitted by a beacon station embodying my invention;

Fig. 4 is a block diagram of a receiver in a beacon system embodying my invention;

Fig. 5 is a circuit diagram of a portion of the receiver illustrated in Fig. 4; and Fig. 6 is a circuit diagram of a modification of a portion of the circuit illustrated in Fig. 5.

Figure 2:
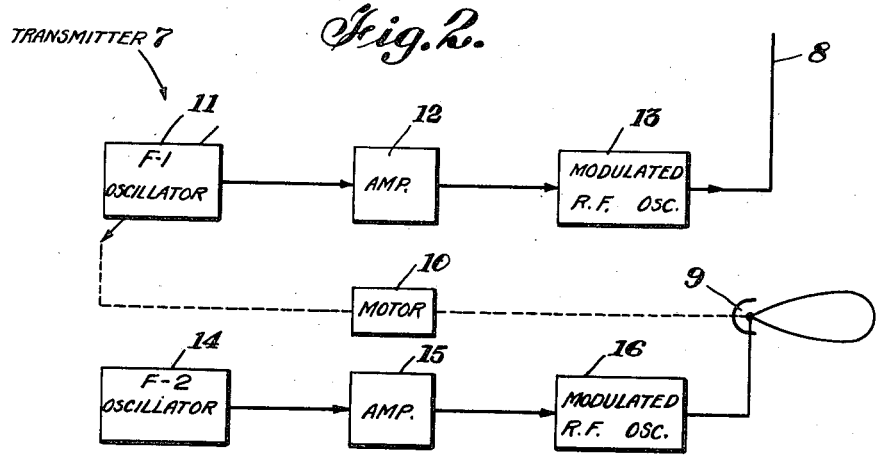
Fig. 2 is a block diagram of a beacon transmitter embodying my invention.

In accordance with the present invention, a beacon station indicated at 1 in Fig. 1 transmits energy in the form of a directional beam having a field pattern substantially in the form of a major lobe 2 and rotating as for example, in a counter-clockwise direction so that the leading edge 3 and the trailing edge 4 will successively pass any object such as for example, a plane 5 within range of the beacon station. The beacon station 1 also simultaneously transmits energy having an omni-directional field pattern 6. As lobe 2 rotates, the characteristics of the energy emitted according to pattern 6 are varied as major lobe 2 rotates so as to provide a unique characteristic for every azimuthal angle through which lobe 2 passes, to thus identify the direction in which lobe 2 points. More specifically, the specific characteristic emitted at a given instant according to the omni-directional pattern 6, may indicate the azimuth of an edge, preferably the leading edge 3, of the lobe 2. The parameters of the transmission according to the omni-directional pattern 6 and according to the lobe 2 are so adjusted that the amplitude of a given characteristic as for example, the amplitude of the carrier wave or the amplitude of a modulation frequency of omni-directional pattern 6 and a point A on the leading edge 3 of lobe 2 bear a specific relationship to each other, as for example, the amplitude of the omni-directional pattern 6 and of the lobe 2 are equal at point A. A similar point B will likewise be found on the trailing edge 4 of lobe 2 which is equal in amplitude to the energy of the omni-directional pattern at that point. In the receiver of the beacon system in accordance with my invention, means are provided for comparing the amplitude of the energy received according to omni-directional pattern 6 and lobe 2 and from this it can be determined when points A and points B are reached, and therefore when the leading or trailing edges of the beam are reached. Consequently, if at the same time as point A or B reaches the receiver, the characteristics emitted on the omni-directional pattern 6 are read indicating in which direction the leading edge 3 or the trailing edge 4 of the beam is pointed at said instant, then a distinct indication of the direction of the receiver from the beacon station can be determined. Thus it will be seen that in the system described, the rotation of the beam 2 serves only to advise the receiver as to when to read the characteristics or azimuthal information emitted by pattern 6. When the amplitude of the rotating lobe 2, as it reaches the receiver becomes equal to the amplitude of the signal received according to pattern 6, the characteristics of energy transmitted according to pattern 6, are read. While the absolute value of the energy transmitted to omni-directional pattern 6 and the absolute value of the energy transmitted according to lobe 2 will diminish the greater the distance from station 1, the relative values between the energy transmitted according to each of these patterns will be substantially constant. Thus the energy received according to pattern 6 may also be used to control an automatic volume control and maintain a steady output from the receiver.

Energy transmitted according to the omni-directional pattern 6 supplies two things, (1) a constant amplitude signal which may be compared with the signal of lobe 2 to find points A and B on the leading and trailing edge of lobe 2 and (2) a signal characteristic constantly varying with the rotation of lobe 2 so as to indicate the azimuth of the leading or trailing edge of lobe 2. The signal transmitted according to lobe 2 should contain a constant amplitude characteristic for the purposes of comparison with the constant amplitude characteristic of pattern 6 so as to determine points A and B. No variation other than rotation of lobe 2 is required in connection therewith. While the signal sent according to omni-directional pattern 6 may consist of one component of constant amplitude and another component of either variable amplitude or frequency, it is preferable, for the sake of simplicity, to use a single signal for the omni-directional pattern 6 which has a constant amplitude but which varies in frequency as the lobe 2 rotates. Thus for example, the signal transmitted according to pattern 6 may be a single signal having a given carrier frequency, and having a modulation frequency (hereinafter referred to as $F_1$) which may vary for example, from 1000 to 1360 cycles per second as the leading edge 3 of lobe 2 moves through 360°. The signal sent out according to lobe 2 should be distinguishable from that sent out according to pattern 6 and for this purpose while the carrier frequency is preferably the same, the modulation frequency sent out according to lobe 2 is preferably different and this frequency (hereinafter referred to as $F_2$) may be for example, 4000 cycles, and is not varied while lobe 2 rotates. The foregoing will be best understood from the following description of beacon systems embodying my invention.

Referring now to Fig. 2, the beacon station 7 there illustrated, includes an omni-directional antenna 8 for sending out energy in the form of pattern 6 and a directional antenna system 9 for sending out energy in the form of lobe 2. Antenna system 9 is rotated by any suitable means such as for example, a motor 10 which at the same time controls a variable audio frequency generator 11 so as to vary the frequency output of said generator 11 as the antenna 9 rotates. The output of generator 11 is fed through an amplifier 12 to modulate a radio frequency oscillator 13 whose output is then fed to omni-directional antenna 8. Another audio frequency oscillator 14 transmitting in a frequency $F_2$, which is different from that of generator 11, supplies energy though an amplifier 15 to modulate a second radio frequency oscillator 16, which in turn feeds antenna system 9. The radio frequency fed to antennas 8 and 9 may be the same.

Figure 3:
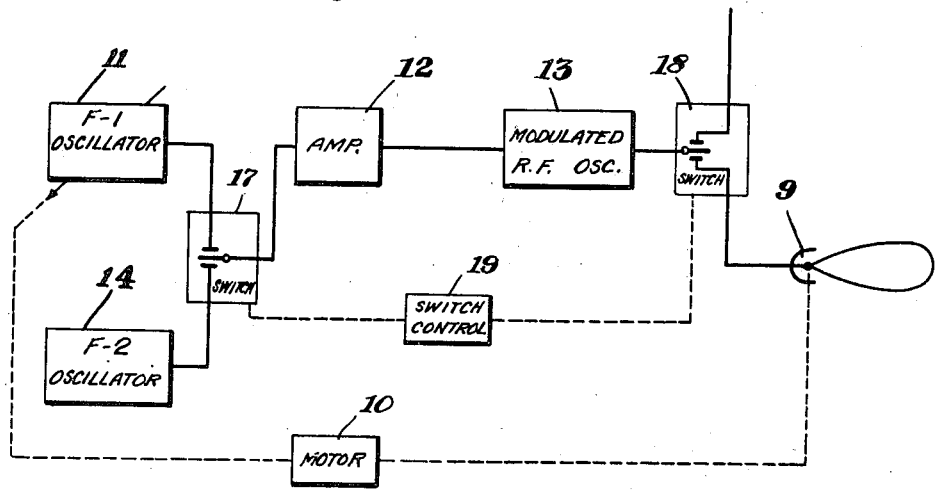
Fig. 3 is a block diagram of a modified form of beacon transmitter embodying my invention.

In the system of Fig. 2, two radio frequency oscillators 13 and 16 are used. One of these can, however, be dispensed with if rapid switching is used in the manner illustrated for example, in Fig. 3. In Fig. 3, a switch 17 alternately connects audio frequency oscillators 11 and 14 to amplifier 12, whose output is used to modulate the single radio frequency oscillator 13. The output of oscillator 13 is also switched at the same rate by a switch 18 which may be controlled by a switching control means 19 to synchronize the operation of switch 18 with switch 17. The output of oscillator 13 is alternately switched to antennas 8 and 9. The rate of switching is so high as compared with the rate of rotation of the rotating antenna 9 as not to interfere with the operation of the system.

The receiver may consist, as illustrated in Fig. 4, of an omni-directional antenna 20 whose output is fed to a radio frequency amplifier 21 and through a mixer 22 where it is mixed with energy from a local oscillator 23. The output of mixer 22 is then fed to an intermediate frequency amplifier 24, whose output is in turn fed through a demodulator 25 wherein the intermediate frequency is removed leaving only the audio frequency modulation. The output of demodulator 25 is then fed through three separate channels 26, 27 and 28 respectively.

As stated hereinbefore, the amplitude of the signal of omni-directional pattern 6 may be used to provide for automatic volume control. This is accomplished in the receiver of Fig. 4 by passing the output of demodulator 25 through a band-pass filter 29 which only permits the frequencies $F_1$ that is, the frequencies of the omni-directional pattern 6, to pass therethrough. The output of filter 29 is then applied to an automatic volume control detector 30 whose output is then in turn used to control the gain of amplifier 24, as for example, over a line 31.

As stated hereinbefore, a constant amplitude component of the signal transmitted according to pattern 6 may be used to find points A and and the leading and trailing edges 3 and 4 respectively of lobe 2, by comparing this constant amplitude with the amplitude of the signal energy of lobe 2 as it passes the receiver. For this purpose, the output of band pass filter 29 is also applied through channel 27 to a comparison arrangement 32 in which it is compared with the amplitude of the energy received according to lobe 2. For this purpose the output of demodulator 25 is connected to a band pass filter 33, which only permits the audio frequency of the signal according to lobe 2 to pass therethrough. In comparison system 32, the amplitudes of the output of band pass filter ($F_1$) 29 and the band pass filter ($F_2$) 33 are compared and when these are found to be equal, which occurs at points A and B, a switch 34 in channel 27 is momentarily closed.

Channel 27 is the channel through which the azimuth information is conveyed to the indicating system. Since this azimuthal information is derived from the energy transmitted according to pattern 6 (the frequencies $F_1$), the output of the filter 29 is applied through the switch 34 and through a second switch 35 to the indicating system 36.

It will be apparent, however, that an ambiguity in the resulting indication will occur if no distinction is made between points A and B on the leading and trailing edges of lobe 2. To distinguish between these two points as for example by only allowing the indicating system to be affected when point A is reached, a comparing circuit 37 is used to control the switch 35. In the comparing circuit 37 where a comparison is likewise made between the amplitudes of the output of band pass filters 29 and 33 respectively, means are provided for controlling the switch 35 so that normally switch 35 is closed and will pass energy therethrough. When however, the energy received according to lobe 2 reaches a certain value greater than the energy received according to pattern 6, (as is for example indicated at C, Fig. 1) then the switch 35 is opened under the control of the comparing circuit 37. The switch 35 is of the type which will stay open for a relatively long time before it will close or the circuit 37 may be arranged to maintain switch 35 open for a relatively long time, so that switch 35 will still be open when point B is passed and no signal will therefore go to the indicating system 36.

The indicating system 36 may consist of any suitable device such as for example, a cathode ray tube or more simply a frequency meter in the system hereinbefore described.

The relation between the comparison arrangement 32 and comparing circuit 37 and their switches 34 and 35 will be best understood in connection with Figs. 5 and 6.

In comparison arrangement 32, energy from filters 29 and 33 are compared as to amplitude and when the energy from each of said filters is equal, switch 35 is open. One type of comparison arrangement for this purpose is illustrated in Fig. 5.

In the arrangement 32 of Fig. 5 energy from filters 33 and 29 are fed to the primaries of transformers 38 and 39 respectively, the secondaries of which drive current through rectifiers 40 and 41 and resistors 42 and 43 respectively so as to produce direct current voltages across said resistors 42 and 43. Resistors 42 and 43 are arranged in bucking relation so that when the output of filters 29 and 33 are equal, then equal and opposite voltages will appear across resistors 42 and 43. These voltages are used to control the bias on two triodes 44 and 45 by being applied over lines 46 and 47 to the grids thereof. A source of alternating current is applied parallel to these grids and the value of the alternating current produced in the plate circuits of tubes 44 and 45 is controlled by the biasing voltages derived from filters 33 and 29. While any source of alternating current may be employed, since filter 29 provides a constant amplitude output, its output may be used for this purpose. Accordingly, an additional transformer 48 has its primary connected in series with transformer 39 and has one end of its secondary grounded with the other end being connected to the mid-point between resistors 42 and 43. Thus the output of transformer 48 is applied in parallel to the grids of triodes 44 and 45. The anodes of tubes 44 and 45 are connected to opposite ends of a center tapped primary of a transformer 49, whose tap is connected to a source of anode potential and whose secondary feeds through a rectifier 50 to the grid of a tube 51 in the switch 34, the current through rectifier 50 flowing through a resistor 52 across which the voltage is developed which is applied to the grid tube 51. The voltage developed across resistor 52 and appearing across a shunt condenser 53 is used to block tube 51 except for short periods of time when the output of filters 33 and 29 reach a predetermined relationship, in the present instance, equality.

The comparison arrangement 32 operates as follows. As long as the energy derived from filters 29 and 33 is unequal, one of the tubes 44 or 45 will be biased to greater conductivity than the other by reason of the voltages produced across resistors 42 and 43 and their shunt condensers 54 and 55 and consequently its output will be greater than the output of said other. Therefore there will be unequal currents through the halves of the primary of transformer 49 and one magnetic field will be greater than the other, thereby inducing a voltage in the secondary of transformer 49 which will result in a negative potential being applied to the grid of tube 51 blocking said tube. When, however, points A and B of the rotating lobe of the beacon reach the receiver, the output of filters 29 and 33 will be equal and tubes 44 and 45 will have equal gain whereby the current flow in the halves of the primary of transformer 49 will be equal and in opposite directions, producing magnetic fields which cancel each other, thereby resulting in no voltage being induced in the secondary of transformer 49. With no current flowing through rectifier 50, condenser 53 discharges very rapidly and the grid of tube 51 in switch 34 is unlocked, thereby closing said switch and permitting energy to go therethrough. When switch 34 is closed, the azimuthal information from the output of filter 25 is sent through said switch as for example, by having the secondary of a transformer 56 connected in series with the grid and the primary thereof connected to the output of filter 29. The discharge time of condensers 54, 55 is such that variations of the energy received from the lobe 2 are closely followed.

The azimuthal information applied to the grid of tube 51 appears, for the brief moment that said tube conducts, in the primary of an output transformer 57 whose secondary is connected in switch 35 to the grid of a tube 58, which is normally conductive and whose output goes to the indicating system 36.

To distinguish between points A and B on the beam, use is made of the comparing circuit 37. The circuit includes two transformers 59 and 60, whose primaries are also connected to the output of filters 33 and 29 respectively and the energy in whose secondaries is likewise rectified in rectifiers 61 and 62, the current then flowing through resistors 63 and 64, with the resistors 63 and 64 being arranged in bucking relationship. The total voltage across resistors 63 and 64 is used to control the operation of tube 58 and switch 35. For this purpose, the free ends of resistors 63 and 64 are connected to the free end of the secondary of transformer 57 and to ground respectively.

The comparing circuit 37 and the switch 35 cooperate as follows. Ordinarily, that is, before the lobe 2 of the beam reaches the receiver, the energy derived from filter 33 is less than the energy derived from filter 29. Accordingly the total voltage across the resistors is such as to apply a positive voltage to the grid of tube 58. Thus tube 58 conducts and will continue to conduct even after point A of the lobe reaches the receiver and the voltages across resistors 63 and 64 are equal. However, as the lobe continues to rotate, the output of filter 33 increases so that the voltage across resistor 63 becomes greater than the voltage across resistor 64, thereby producing a resultant negative voltage which is applied to the grid of tube 58. At some point C between points A and B of lobe 2, the voltage produced across resistor 63 will be so much greater than the voltage across resistor 64 as to block tube 58. These voltages also appear across the condensers 65 and 66 which are arranged across resistors 63 and 64 respectively and said condensers have a relatively long discharge time so that the resultant voltage which blocks tube 58 after point C of the lobe has reached the receiver, will continue for a substantial time after point B of the lobe passes the receiver. Consequently, while the azimuth information will pass through switch 35 when point A of the lobe passes the receiver, the switch 35 will be open when the next equi-signal point B reaches the receiver and consequently there will be no output to the indicating system at this latter point.

While the comparison system 32 and the comparing circuit 37 and the switches 34 and 35 have all been electronically operated and controlled, it will be apparent that relays may be employed in place thereof. A typical illustration of this is shown in Fig. 6. The comparison arrangement 67 of Fig. 6 includes transformers 38 and 39, rectifiers 40 and 41, resistors 42 and 43 arranged in bucking relation and shunted by condensers 54 and 55 respectively. In the comparison arrangement 67, however, the alternating current source, which is applied to the grid of tubes 44 and 45, is omitted. Instead the direct current voltages across resistors 42 and 43 are used to control the current flow in the plate circuits of triodes 44 and 45. The triodes 44 and 45 feed into the opposite ends of a tapped solenoid 68, whose tap is connected to the positive side of a source of voltage. It will be seen that when the voltages across resistors 42 and 43 are equal, the fields in the bucking halves of the solenoid will cancel each other. When no resultant magnetic field exists, the contact 69 of a relay 70 closes as a result of the action of spring 71, thereby connecting the azimuth information derived from filter 29 to the indicating system. When, however, the voltages 42 and 43 are unbalanced and the current flowing through the halves of solenoid 68 are unbalanced, a magnetic field is produced which attracts an iron or iron alloy element 72 which is mechanically connected to the contact 69 and opens said contact. At point A when the voltages across resistors 42 and 43 balance, the contact 69 momentarily closes. Likewise at point B the contact 69 closes. At all other times since there is a resultant magnetic field produced by the solenoid 68, which pulls on the element 72, the contact 69 is open.

While I have described embodiments of my invention, numerous modifications will readily occur to those versed in the art both in the details of the specific embodiment as well as in the system as a whole. For example, in the details of the embodiments here illustrated, many simplifications or enlargements can be made. For example, referring to Fig. 5, transformer 56 and switch 34 may be eliminated and in place thereof the secondary of transformer 48 may also be connected to supply azimuthal information to the grid of tube 51, that is, it may be connected to the lower end of resistor 52. In the same figure, for the constant voltage alternating current supplied by transformer 48, a generator may be substituted. These are illustrations of some immediately obvious changes in the details of the system that would occur to one versed in the art. Considering the embodiments generally, it will be seen that the three different functions performed by the incoming signals, that is, control of the automatic volume control system, azimuthal information and the determination of the equi-signal point A, may be derived from three different types of signals as opposed to the two herein shown. Furthermore the azimuthal information itself may be derived from a plurality of different modulation signals as for example as described in E. Labin-D. D. Grieg, Serial No. 603,952, filed July 9, 1945 in which three frequencies two are varied with respect to each other and the third of which is constant and gives a control voltage for comparison purposes.

Accordingly, while I have described above the principles of my invention in connection with specific apparatus, and particular modifications thereof, it is to be clearly understood that this description is made only by way of example and not as a limitation on the scope of my invention as defined in the accompanying claims.

I claim:

1. A beacon system comprising transmitting means including means for radiating energy in a directional beam, said energy having a component of constant amplitude, means for rotating said beam, and means for radiating energy in an omni-directional pattern in which the energy contains a constant amplitude component, and means for varying a characteristic of a component of the energy radiated from one of said radiating means with the angular position of the beam; and a receiver including means for receiving the radiated energy, an indicating system responsive to said component of varying characteristic, means for applying said component of the varying characteristic to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein the comparison system includes means for closing the switching system in response to equal amplitudes of the constant amplitude components.

2. A beacon system comprising transmitting means including means for radiating energy in a directional beam, said energy having a component of constant amplitude, means for rotating said beam, and means for radiating energy in an omni-directional pattern in which the energy contains a constant amplitude component, and means for varying a characteristic of a component of the energy radiated from one of said radiating means with the angular position of the beam; and a receiver including means for receiving the radiated energy, an indicating system responsive to said component of varying characteristic, means for applying said component of the varying characteristic to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein said means for radiating energy in an omni-directional pattern includes a variable frequency oscillator, a carrier frequency oscillator, means for modulating said carrier frequency oscillator with the output of said variable frequency oscillator, an omni-directional antenna system fed with energy derived from said carrier frequency oscillator, and means controlling the frequency of said variable frequency oscillator as the beam is angularly shifted.

3. A beacon system comprising transmitting means including means for radiating energy in a directional beam, said energy having a component of constant amplitude, means for rotating said beam, and means for radiating energy in an omni-directional pattern in which the energy contains a constant amplitude component, and means for varying a characteristic of a component of the energy radiated from one of said radiating means with the angular position of the beam; and a receiver including means for receiving the radiated energy, an indicating system responsive to said component of varying characteristic, means for applying said component of the varying characteristic to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein said switching system includes a normally opened switch and a normally closed switch arranged in series therewith and in series between the indicating system, and said comparison system includes a first comparing means for closing the normally opened switch in response to a given relationship between the amplitudes of the constant amplitude components of the beam and the pattern, and a second comparing means for opening the normally closed switch when the amplitude of the constant amplitude component derived from the beam exceeds, by a fixed amount, the amplitude it had in said given relationship.

4. A receiver for a beacon system in which energy having a comparative constant amplitude is radiated in the form of a directional beam which is rotated and energy is also radiated in the form of an omni-directional pattern which has a constant amplitude component, and the radiated energy also includes a component whose characteristics vary with the angular position of the beam, said receiver comprising means for receiving the radiated energy, an indicating system responsive to the component of varying characteristics, means for applying the component of varying characteristics to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein the comparison system includes means for closing the switching system in response to equal amplitudes of the constant amplitude component derived from the beam and the constant amplitude component derived from the pattern.

5. A receiver for a beacon system in which energy having a comparative constant amplitude is radiated in the form of a directional beam which is rotated and energy is also radiated in the form of an omni-directional pattern which has a constant amplitude component, and the radiated energy also includes a component whose characteristics vary with the angular position of the beam, said receiver comprising means for receiving the radiated energy, an indicating system responsive to the component of varying characteristics, means for applying the component of varying characteristics to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein said component of varying characteristics consists of a modulation frequency which is varied as the beam is rotated, and said indicating system includes a frequency meter.

6. A receiver for a beacon system in which energy having a comparative constant amplitude is radiated in the form of a directional beam which is rotated and energy is also radiated in the form of an omni-directional pattern which has a constant amplitude component, and the radiated energy also includes a component whose characteristics vary with the angular position of the beam, said receiver comprising means for receiving the radiated energy, an indicating system responsive to the component of varying characteristics, means for applying the component of varying characteristics to the indicating system including a normally opened switching system, a comparison system for closing the switching system in response to a given relationship between the amplitude of the constant amplitude component derived from the beam and the constant amplitude component derived from the pattern, and means for applying both of said constant amplitude components to the comparison system, and wherein said switching system includes a normally opened switch and a normally closed switch arranged in series therewith and in series between the indicating system, and said comparison system includes a first comparing means for closing the normally opened switch in response to a given relationship between the amplitudes of the constant amplitude components of the beam and the pattern, and a second comparing means for opening the normally closed switch when the amplitude of the constant amplitude component derived from the beam exceeds, by a fixed amount, the amplitude it has in said given relationship.

RALPH B. READE.

REFERENCES CITED

The following references are of record in the file of this patent:

UNITED STATES PATENTS

| Number | Name | Date |
| --- | --- | --- |
| 1,916,358 | Bruce | July 4, 1933 |
| 1,983,079 | Hansen | Dec. 4, 1934 |
| 2,137,241 | Dunmore | Nov. 22, 1938 |
| 2,151,170 | Tellegen | Mar. 21, 1939 |
| 2,184,843 | Kramer | Dec. 26, 1939 |
| 2,257,320 | Williams | Sept. 30, 1941 |
| 2,279,031 | Cockerell | Apr. 7, 1942 |
| 2,288,815 | Luck | July 7, 1942 |
| 2,394,157 | Earp | Feb. 5, 1946 |
| 2,402,410 | Kear | June 18, 1946 |
| 2,433,351 | Earp | Dec. 30, 1947 |